United States Patent
Li et al.

(10) Patent No.: US 8,041,131 B2
(45) Date of Patent: *Oct. 18, 2011

(54) VARIABLE LENGTH CODING OF COEFFICIENT CLUSTERS FOR IMAGE AND VIDEO COMPRESSION

(75) Inventors: Junlin Li, Atlanta, GA (US); Ghassan AlRegib, Savannah, GA (US); Wen-hsiung Chen, Sunnyvale, CA (US); Dihong Tian, San Jose, CA (US); Pi Sheng Chang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 887 days.

This patent is subject to a terminal disclaimer.

(21) Appl. No.: 12/030,821

(22) Filed: Feb. 13, 2008

(65) Prior Publication Data
US 2009/0087113 A1    Apr. 2, 2009

Related U.S. Application Data

(60) Provisional application No. 60/976,853, filed on Oct. 2, 2007, provisional application No. 60/976,847, filed on Oct. 2, 2007.

(51) Int. Cl.
*G06K 9/36* (2006.01)

(52) U.S. Cl. ........ 382/232; 382/245; 382/246; 341/167; 341/65; 341/50; 341/51

(58) Field of Classification Search ............... 382/245, 382/146, 232
See application file for complete search history.

(56) References Cited

U.S. PATENT DOCUMENTS 7,242,328 B1 *   7/2007   Chen et al. ............... 341/67
7,471,840 B2 *  12/2008   Toebes et al. ........... 382/245
7,486,212 B2 *   2/2009   Chen et al. ............... 341/67
(Continued)

FOREIGN PATENT DOCUMENTS
WO    WO 2006001994 A2 *   1/2006
(Continued)

OTHER PUBLICATIONS

PCT Search Report for PCT Application No. PCT/US2008/078359 mailed on Mar. 19, 2009.

*Primary Examiner* — Brian Q Le
*Assistant Examiner* — Mek Bekele
(74) *Attorney, Agent, or Firm* — Dov Rosenfeld; INVENTEK

(57) ABSTRACT

A coding method, apparatus, and medium with software encoded thereon to implement a coding method. The coding method includes encoding cluster of consecutive non-zero-valued coefficients, the encoding of a cluster including jointly encoding joint events that each are defined by at least two parameters: the number of zero-valued coefficients preceding the cluster, and the number of non-zero-valued coefficients in the cluster. The encoding of the cluster also includes encoding a parameter indicative of the number of amplitude-1 trailing non-zero-valued coefficients in the cluster, in one version with the parameter indicative of the number of trailing amplitude-1 coefficients part of the joint events such that the coding is according to a 3-dimensional joint variable length coding table. The method further includes encoding the amplitudes of the non-zero-valued coefficients that are not encoded by the joint encoding, e.g., encoding the amplitudes of the other than the trailing amplitude-1 coefficients.

25 Claims, 8 Drawing Sheets

U.S. PATENT DOCUMENTS

| | | | |
|---|---|---|---|
| 2005/0276487 A1* | 12/2005 | Chen et al. | 382/232 |
| 2006/0039615 A1 | 2/2006 | Chen et al. | 382/232 |
| 2006/0056720 A1 | 3/2006 | Chen et al. | 382/245 |
| 2007/0019877 A1* | 1/2007 | Chen et al. | 382/245 |
| 2007/0036448 A1* | 2/2007 | Kang | 382/246 |
| 2007/0121728 A1* | 5/2007 | Wang et al. | 375/240.18 |
| 2007/0217506 A1* | 9/2007 | Yang et al. | 375/240.03 |

FOREIGN PATENT DOCUMENTS

| | | |
|---|---|---|
| WO | WO2006001994 A2 * | 1/2006 |
| WO | WO 2007/056657 | 5/2007 |

* cited by examiner

| nonzero cluster of a run-length of 1 | | | |
|---|---|---|---|
| Run length of 0's | 0 | (0,1,0) | (0,1,1) |
| | 1 | (1,1,0) | (1,1,1) |
| | 2 | (2,1,0) | (2,1,1) |
| | 3 | (3,1,0) | (3,1,1) |
| | 4 | (4,1,0) | (4,1,1) |
| | 5 | (5,1,0) | (5,1,1) |
| | 6 | (6,1,0) | (6,1,1) |
| | 7 | (7,1,0) | (7,1,1) |
| | 8 | (8,1,0) | (8,1,1) |
| | ... | ... | ... |

FIG. 5A

| nonzero cluster with a run-length of 2 | | | | |
|---|---|---|---|---|
| Run length of 0's | 0 | (0,2,0) | (0,2,1) | (0,2,2) |
| | 1 | (1,2,0) | (1,2,1) | (1,2,2) |
| | 2 | (2,2,0) | (2,2,1) | (2,2,2) |
| | 3 | (3,2,0) | (3,2,1) | (3,2,2) |
| | 4 | (4,2,0) | (4,2,1) | (4,2,2) |
| | 5 | (5,2,0) | (5,2,1) | (5,2,2) |
| | 6 | (6,2,0) | (6,2,1) | (6,2,2) |
| | 7 | (7,2,0) | (7,2,1) | (7,2,2) |
| | 8 | (8,2,0) | (8,2,1) | (8,2,2) |
| | ... | ... | ... | ... |

FIG. 5B

| nonzero cluster with a run-length of 3 | | | | | |
|---|---|---|---|---|---|
| Run length of 0's | 0 | (0,3,0) | (0,3,1) | (0,3,2) | (0,3,3) |
| | 1 | (1,3,0) | (1,3,1) | (1,3,2) | (1,3,3) |
| | 2 | (2,3,0) | (2,3,1) | (2,3,2) | (2,3,3) |
| | 3 | (3,3,0) | (3,3,1) | (3,3,2) | (3,3,3) |
| | 4 | (4,3,0) | (4,3,1) | (4,3,2) | (4,3,3) |
| | 5 | (5,3,0) | (5,3,1) | (5,3,2) | (5,3,3) |
| | 6 | (6,3,0) | (6,3,1) | (6,3,2) | (6,3,3) |
| | 7 | (7,3,0) | (7,3,1) | (7,3,2) | (7,3,3) |
| | 8 | (8,3,0) | (8,3,1) | (8,3,2) | (8,3,3) |
| | ... | ... | ... | | |

| nonzero cluster with a run-length of n (n >3) | | | | | | |
|---|---|---|---|---|---|---|
| Run length of 0's | 0 | (0,n,0) | (0,n,1) | (0,n,2) | ... | (0,n,n-1) | (0,n,n) |
| | 1 | (1,n,0) | (0,n,1) | (0,n,2) | ... | (1,n,n-1) | (0,n,n) |
| | 2 | (2,n,0) | (0,n,1) | (0,n,2) | ... | (2,n,n-1) | (0,n,n) |
| | 3 | (3,n,0) | (0,n,1) | (0,n,2) | ... | (3,n,n-1) | (0,n,n) |
| | 4 | (4,n,0) | (0,n,1) | (0,n,2) | ... | (4,n,n-1) | (0,n,n) |
| | 5 | (5,n,0) | (0,n,1) | (0,n,2) | ... | (5,n,n-1) | (0,n,n) |
| | 6 | (6,n,0) | (0,n,1) | (0,n,2) | ... | (6,n,n-1) | (0,n,n) |
| | 7 | (7,n,0) | (0,n,1) | (0,n,2) | ... | (7,n,n-1) | (0,n,n) |
| | 8 | (8,n,0) | (0,n,1) | (0,n,2) | ... | (8,n,n-1) | (0,n,n) |
| | ... | ... | ... | ... | ... | ... | ... |

FIG. 5D

| nonzero cluster of a run–length of 1 | | |
|---|---|---|
| Run length of 0's | 0 | (0,1,L) |
| | 1 | (1,1,L) |
| | 2 | (2,1,L) |
| | 3 | (3,1,L) |
| | 4 | (4,1,L) |
| | 5 | (5,1,L) |
| | 6 | (6,1,L) |
| | 7 | (7,1,L) |
| | 8 | (8,1,L) |
| | ... | ... |

FIG. 5E

| nonzero cluster with a run–length of 2 | | | | | |
|---|---|---|---|---|---|
| Run length of 0's | 0 | (0,2,xx) | (0,2,x1) | (0,2,1x) | (0,2,11) |
| | 1 | (1,2,xx) | (1,2,x1) | (1,2,1x) | (1,2,11) |
| | 2 | (2,2,xx) | (2,2,x1) | (2,2,1x) | (2,2,11) |
| | 3 | (3,2,xx) | (3,2,x1) | (3,2,1x) | (3,2,11) |
| | 4 | (4,2,xx) | (4,2,x1) | (4,2,1x) | (4,2,11) |
| | 5 | (5,2,xx) | (5,2,x1) | (5,2,1x) | (5,2,11) |
| | 6 | (6,2,xx) | (6,2,x1) | (6,2,1x) | (6,2,11) |
| | 7 | (7,2,xx) | (7,2,x1) | (7,2,1x) | (7,2,11) |
| | 8 | (8,2,xx) | (8,2,x1) | (8,2,1x) | (8,2,11) |
| | ... | ... | ... | ... | ... |

FIG. 5F

| nonzero cluster with a run–length of 3 | | | | | | | | | |
|---|---|---|---|---|---|---|---|---|---|
| Run length of 0's | 0 | (0,3,xxx) | (0,3,xx1) | (0,3,x1x) | (0,3,1xx) | (0,3,x11) | (0,3,1x1) | (0,3,11x) | (0,3,111) |
| | 1 | (1,3,xxx) | (1,3,xx1) | (1,3,x1x) | (1,3,1xx) | (1,3,x11) | (1,3,1x1) | (1,3,11x) | (1,3,111) |
| | 2 | (2,3,xxx) | (2,3,xx1) | (2,3,x1x) | (2,3,1xx) | (2,3,x11) | (2,3,1x1) | (2,3,11x) | (2,3,111) |
| | 3 | (3,3,xxx) | (3,3,xx1) | (3,3,x1x) | (3,3,1xx) | (3,3,x11) | (3,3,1x1) | (3,3,11x) | (3,3,111) |
| | 4 | (4,3,xxx) | (4,3,xx1) | (4,3,x1x) | (4,3,1xx) | (4,3,x11) | (4,3,1x1) | (4,3,11x) | (4,3,111) |
| | 5 | (5,3,xxx) | (5,3,xx1) | (5,3,x1x) | (5,3,1xx) | (5,3,x11) | (5,3,1x1) | (5,3,11x) | (5,3,111) |
| | 6 | (6,3,xxx) | (6,3,xx1) | (6,3,x1x) | (6,3,1xx) | (6,3,x11) | (6,3,1x1) | (6,3,11x) | (6,3,111) |
| | 7 | (7,3,xxx) | (7,3,xx1) | (7,3,x1x) | (7,3,1xx) | (7,3,x11) | (7,3,1x1) | (7,3,11x) | (7,3,111) |
| | 8 | (8,3,xxx) | (8,3,xx1) | (8,3,x1x) | (8,3,1xx) | (8,3,x11) | (8,3,1x1) | (8,3,11x) | (8,3,111) |
| | ... | ... | ... | ... | ... | ... | ... | ... | ... |

FIG. 5G

|  |  | Run Length of non-0's | | | | | |
|---|---|---|---|---|---|---|---|
|  |  | 1 | 2 | 3 | 4 | 5 | ... |
| Run length of 0's | 0 | $C_1(0,1)$ | $C_1(0,2)$ | $C_1(0,3)$ | $C_1(0,4)$ | $C_1(0,5)$ | ... |
|  | 1 | $C_1(1,1)$ | $C_1(1,2)$ | $C_1(1,3)$ | $C_1(1,4)$ | $C_1(1,5)$ | ... |
|  | 2 | $C_1(2,1)$ | $C_1(2,2)$ | $C_1(2,3)$ | $C_1(2,4)$ | $C_1(2,5)$ | ... |
|  | 3 | $C_1(3,1)$ | $C_1(3,2)$ | $C_1(3,3)$ | $C_1(3,4)$ | $C_1(3,5)$ | ... |
|  | 4 | $C_1(4,1)$ | $C_1(4,2)$ | $C_1(4,3)$ | $C_1(4,4)$ | $C_1(4,5)$ | ... |
|  | 5 | $C_1(5,1)$ | $C_1(5,2)$ | $C_1(5,3)$ | $C_1(5,4)$ | $C_1(5,5)$ | ... |
|  | 6 | $C_1(6,1)$ | $C_1(6,2)$ | $C_1(6,3)$ | $C_1(6,4)$ | $C_1(6,5)$ | ... |
|  | 7 | $C_1(7,1)$ | $C_1(7,2)$ | $C_1(7,3)$ | $C_1(7,4)$ | $C_1(7,5)$ | ... |
|  | 8 | $C_1(8,1)$ | $C_1(8,2)$ | $C_1(8,3)$ | $C_1(8,4)$ | $C_1(8,5)$ | ... |
|  | ... | ... | ... | ... | ... | ... | ... |
|  | N | $C_1(N,1)$ | $C_1(N,2)$ | $C_1(N,3)$ | $C_1(N,4)$ | $C_1(N,5)$ | ... |

FIG. 6

|  |  | Non-1 amplitude of immediately preceding the trailing 1's | | | | | | |
|---|---|---|---|---|---|---|---|---|
|  |  | 0 | 2 | 3 | 4 | 5 | 6 | ... |
| Run length of trailing 1's | 0 | – | $C_2(0,2)$ | $C_2(0,3)$ | $C_2(0,4)$ | $C_2(0,5)$ | $C_2(0,6)$ | ... |
|  | 1 | – | $C_2(1,2)$ | $C_2(1,3)$ | $C_2(1,4)$ | $C_2(1,5)$ | $C_2(1,6)$ | ... |
|  | 2 | – | $C_2(2,2)$ | $C_2(2,3)$ | $C_2(2,4)$ | $C_2(2,5)$ | $C_2(2,6)$ | ... |
|  | 3 | – | $C_2(3,2)$ | $C_2(3,3)$ | $C_2(3,4)$ | $C_2(3,5)$ | $C_2(3,6)$ | ... |
|  | 4 | – | $C_2(4,2)$ | $C_2(4,3)$ | $C_2(4,4)$ | $C_2(4,5)$ | $C_2(4,6)$ | ... |
|  | ... | ... | ... | ... | ... | ... | ... | ... |
|  | n-1 | – | $C_2(n-1,2)$ | $C_2(n-1,3)$ | $C_2(n-1,4)$ | $C_2(n-1,5)$ | $C_2(n-1,6)$ | ... |
|  | n | $C_2(n,0)$ | $C_2(n,2)$ | $C_2(n,3)$ | $C_2(n,4)$ | $C_2(n,5)$ | $C_2(n,6)$ | ... |
|  | ... | ... | ... | ... | ... | ... | ... | ... |

FIG. 7

VARIABLE LENGTH CODING OF COEFFICIENT CLUSTERS FOR IMAGE AND VIDEO COMPRESSION

RELATED APPLICATION

This invention claims benefit of priority of and is a conversion of U.S. Provisional Patent Application No. 60/976,853 to inventors Junlin Li, et al. titled "THREE-DIMENSIONAL VARIABLE LENGTH CODING FOR IMAGE AND VIDEO COMPRESSION," and filed Oct. 2, 2007. The contents of U.S. Provisional Patent Application No. 60/976,853 are incorporated herein by reference.

The present disclosure relates to U.S. Provisional Patent Application No. 60/976,847 to Junlin Li et al., titled "REDUCED CODE TABLE SIZE IN JOINT AMPLITUDE AND POSITION CODING OF COEFFICIENTS FOR VIDEO COMPRESSION," and filed Oct. 2, 2007, the contents of which are incorporated herein by reference.

FIELD OF THE INVENTION

The present disclosure relates generally to image and video compression, and in particular to variable length coding of quantized transform coefficients as occurs in transform image and video compression methods.

BACKGROUND

Transform coding and decoding of video data includes usually includes what is called entropy coding. For compression, the pixel information of a picture, e.g., of a residual picture after motion compensated prediction, or of a picture for intra-coding is divided into blocks. The blocks are transformed, e.g., by a discrete cosine transform (DCT) or a similar transform, and the resulting transform coefficients are quantized. The quantized transform coefficients are ordered, e.g., from low to higher frequencies along a path in the two dimensional transform domain. The ordered series of quantized transform coefficients is then losslessly encoded by an entropy coding method. One popular entropy coding method is variable length coding in which one or more events, representing one or more quantized coefficients of properties thereof are encoded by codewords such that events that are more likely-to-occur are encoded on average by codewords that are shorter than are events that are less likely-to-occur. Variable length coding (VLC), due to its nice tradeoff in efficiency and simplicity, has been widely used in entropy coding, particularly when the codec is desired to have low computational complexity.

U.S. patent application Ser. No. 11/069,621 to Chen et al. published as US 20060039615, patent application Ser. No. 11/385,183 published as US 20070019877, and U.S. patent application Ser. No. 11/270,138 published as US 20060056720 describes joint amplitude and position coding methods for variable length coding of quantized transform coefficients as occur in transform image and video compression methods. The methods described in these applications were found to be relatively efficient in coding consecutive nonzero transform coefficients compared to separately encoding runs and the amplitude levels. Assuming conventional transform and quantization of image blocks in which the most-likely-to-occur quantized transform amplitude is 0, and the next most-likely-to-occur amplitude is 1, some of the coding methods disclosed in the above-mentioned patent publications takes into account that the most likely to appear non-zero-valued coefficient has amplitude '1' in an ordered series of quantized transform coefficients and encodes the appearances of amplitude-1/non-amplitude-1 coefficients together with coefficient positions using a multi-dimensional variable length code (VLC) mappings, e.g., a multi-dimensional VLC table. In other words, in one implementation, the following quantities are coded jointly by one variable length codeword: run-length of zeros that precede one or more non-zero coefficients, run-length of the nonzero coefficients, and which of those nonzero coefficients have a magnitude of 1. A separate 1-D VLC is then used to code the amplitudes of non-1 non-zero coefficients.

Experimental results have shown that the joint amplitude and position coding described in the above-mentioned patent publications are successful entropy coding schemes. However, in the joint-coding implementation, the size of the code table used to carry out the joint encoding can grows exponentially as the run-length of nonzero coefficients increases. This may require a prohibitive amount of memory in practical, e.g., low cost and/or low power implementations.

A method that allows for smaller code table sizes while preserving much of the coding efficiency is therefore desirable.

Above described U.S. Provisional Patent Application No. 60/976,847 to Junlin Li et al., titled "REDUCED CODE TABLE SIZE IN JOINT AMPLITUDE AND POSITION CODING OF COEFFICIENTS FOR VIDEO COMPRESSION" includes limiting the jointly coded amplitudes to the last few coefficients of the nonzero cluster, up to a pre-determined number denoted M of such trailing coefficients, such that the size of code table is reduced while the coding efficiency substantially still preserved. The number of trailing coefficients is determined (and also fixed) before the code table is constructed.

BRIEF DESCRIPTION OF THE DRAWINGS

FIGS. 5A, 5B, 5C, 5D respectively show part of the three-dimensional table of events for a method embodiment that uses three-dimensional joint encoding to encode clusters of non-zero-valued coefficients.

FIG. 5E shows a replacement for the table of FIG. 5A. In the replacement table according to an alternative implementation, events for clusters of length one are defined by a third parameter that indicates the actual coefficient magnitude.

FIG. 5F shows a replacement for the table of FIG. 5B. In the replacement table, according to an alternate implementation, events for clusters of length two are defined by a third parameter that not only indicates the number of trailing amplitude-1 coefficients, but further indicates which coefficients in the cluster have amplitude 1.

FIG. 5G shows a replacement for the table of FIG. 5C. In this replacement table, according to an alternate implementation, events for clusters of length three are defined by a third parameter that not only indicates the number of trailing amplitude-1 coefficients, but further indicates which coefficients in the cluster have amplitude 1.

FIG. 6 shows a two-dimensional variable length coding table for coding joint position events defined by the number of zero-valued coefficients preceding a cluster and the number of non-zero-valued coefficients in a cluster.

FIG. 7 shows a two-dimensional variable length coding table for coding the number of trailing amplitude-1 coefficients in a cluster together with the amplitude of the coefficient immediately preceding the trailing amplitude-1 coefficients that is used together with the coding table of FIG. 6 to encode the position and amplitude of clusters of non-zero-valued coefficients in one embodiment of the invention.

DESCRIPTION OF EXAMPLE EMBODIMENTS

Overview

Figure 1:
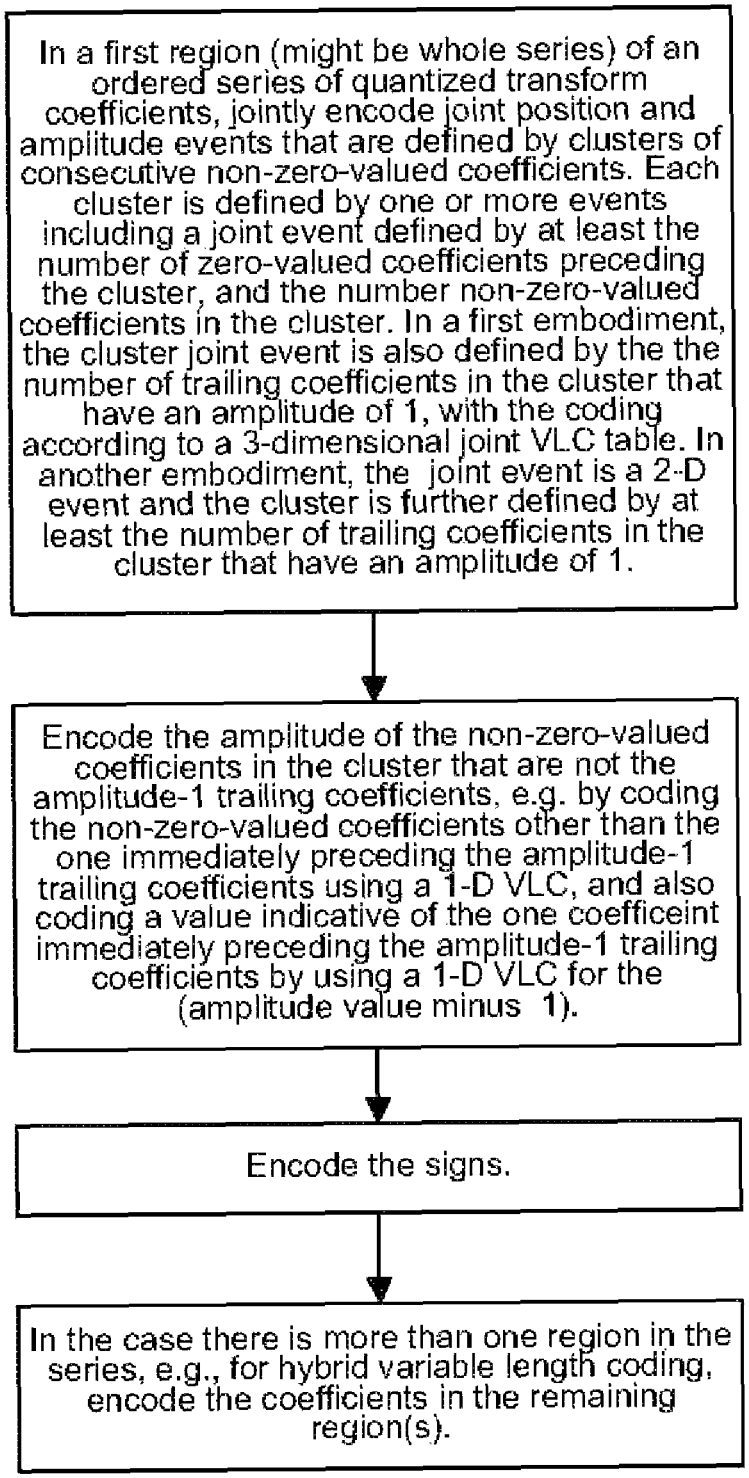
FIG. 1 shows a flowchart of one embodiment of a position and amplitude coding method for coding an ordered series of quantized transform coefficients.

Embodiments of the present invention include a coding method, and apparatus for coding, and logic encoded in one or more computer-readable tangible medium to carry out a coding method. The coding method is to code an ordered series of quantized transform coefficients of a block of image data, in particular, an advanced VLC-based entropy coding method. Other embodiments include a decoding method of decoding a set of codewords that are encoded using the coding method, an apparatus for decoding a set of codewords that are encoded using the coding method, and logic encoded in one or more computer-readable tangible medium to carry out a decoding method.

Particular embodiments include a method comprising:
for a first region of an ordered series of quantized transform coefficients of a block of image data, the first region possibly the whole series, the series having a most likely-to-occur amplitude, and at least one other amplitude including a next-to-most likely-to-occur amplitude, encoding the position and amplitude of each cluster of consecutive coefficients having amplitude other than the most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the coding of each cluster according to at least one multi-dimensional joint encoding mapping such that for at least some events, on average, encoding the events by the joint encoding mapping is such that on average, events that are more likely to occur are encoded by respective codewords that are shorter than the respective codewords for events that are less likely to occur; and
encoding the amplitude of the coefficients that have amplitude other than the most likely-to-occur amplitude and that are not jointly encoded by the encoding of the indication of the number of trailing coefficients in the cluster.

In one embodiment, called the 3-D embodiment, coding of each cluster includes jointly encoding an event defined by three parameters: the number of coefficients having the most likely-to-occur amplitude preceding the cluster, the number of coefficients in the cluster, and a third parameter that includes an indication of the number of trailing coefficients having the next-to-most likely-to-occur amplitude in the cluster, with the jointly encoding being according a three-dimensional joint encoding mapping such that for at least some events, encoding the events by the joint encoding mapping is such that on average, events that are more likely to occur are encoded by respective codewords that are shorter than the respective codewords for events that are less likely to occur.

In one version of the 3-D embodiment, the third parameter is the number of trailing coefficients in the cluster that have the next-to-most likely-to-occur amplitude. In another version, for at least one cluster length, the third parameter includes an indication of which of the coefficients in the cluster have the next-to-most likely-to-occur amplitude.

In a second embodiment, the coding of each cluster includes jointly encoding an event defined by two parameters: the number of coefficients having the most likely-to-occur amplitude preceding the cluster, and the number of coefficients in the cluster, and further encoding a second event for the cluster defined by the number of trailing coefficients having the next-to-most likely-to-occur amplitude in the cluster, with the jointly encoding being according a first two-dimensional joint encoding mapping such that for at least some events, encoding the events by the joint encoding mapping is such that on average, events that are more likely to occur are encoded by respective codewords that are shorter than the respective codewords for events that are less likely to occur.

Particular embodiments also include a computer-readable medium encoded with computer-executable instructions that when executed by one or more processors of a processing system implement a coding method comprising:
for a first region of an ordered series of quantized transform coefficients of a block of image data, the first region possibly the whole series, the series having a most likely-to-occur amplitude, and at least one other amplitude including a next-to-most likely-to-occur amplitude, encoding the position and amplitude of each cluster of consecutive coefficients having amplitude other than the most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the coding of each cluster according to at least one multi-dimensional joint encoding mapping such that for at least some events, encoding the events by the joint encoding mapping is such that on average, events that are more likely to occur are encoded by respective codewords that are shorter than the respective codewords for events that are less likely to occur; and
encoding the amplitude of the coefficients that have amplitude other than the most likely-to-occur amplitude and that are not jointly encoded by the encoding of the indication of the number of trailing coefficients in the cluster.

Particular embodiments also include an apparatus comprising:
a first region encoder in a first region of an ordered series of quantized transform coefficients of a block of image data, the first region possibly the whole series, the series having a most likely-to-occur amplitude, and at least one other amplitude including a next-to-most likely-to-occur amplitude, the first region encoder operative to encode the position and amplitude of each cluster of consecutive coefficients having amplitude other than the most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the coding of each cluster according to at least one multi-dimensional joint encoding mapping such that for at least some events, encoding the events by the joint encoding mapping is such that on average, events that are more likely to occur are encoded by respective codewords that are shorter than the respective codewords for events that are less likely to occur; and an amplitude encoder operative to encode the amplitude of the coefficients that have amplitude other than the most likely-to-occur amplitude and that are not jointly encoded by the encoding of the indication of the number of trailing coefficients in the cluster.

Particular embodiments also include a decoding method comprising: recognizing codewords in a set of concatenated codewords, the codewords formed by a coding method, and decoding the recognized codewords using a plurality of code mappings. The coding method comprises:

for a first region of an ordered series of quantized transform coefficients of a block of image data, the first region possibly the whole series, the series having a most likely-to-occur amplitude, and at least one other amplitude including a next-to-most likely-to-occur amplitude, encoding the position and amplitude of each cluster of consecutive coefficients having amplitude other than the most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the coding of each cluster according to at least one multi-dimensional joint encoding mapping such that for at least some events, encoding the events by the joint encoding mapping is such that on average, events that are more likely to occur are encoded by respective codewords that are shorter than the respective codewords for events that are less likely to occur; and encoding the amplitude of the coefficients that have amplitude other than the most likely-to-occur amplitude and that are not jointly encoded by the encoding of the indication of the number of trailing coefficients in the cluster.

Particular embodiments also include a computer-readable medium encoded with computer-executable instructions that when executed by one or more processors of a processing system implement a decoding method comprising recognizing codewords in a set of concatenated codewords, the codewords formed by a coding method, and decoding the recognized codewords using a plurality of code mappings. The coding method comprises:

for a first region of an ordered series of quantized transform coefficients of a block of image data, the first region possibly the whole series, the series having a most likely-to-occur amplitude, and at least one other amplitude including a next-to-most likely-to-occur amplitude, encoding the position and amplitude of each cluster of consecutive coefficients having amplitude other than the most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the coding of each cluster according to at least one multi-dimensional joint encoding mapping such that for at least some events, encoding the events by the joint encoding mapping is such that on average, events that are more likely to occur are encoded by respective codewords that are shorter than the respective codewords for events that are less likely to occur; and encoding the amplitude of the coefficients that have amplitude other than the most likely-to-occur amplitude and that are not jointly encoded by the encoding of the indication of the number of trailing coefficients in the cluster.

Particular embodiments also include an apparatus for decoding comprising: a codeword recognizer operative to recognize codewords in a set of concatenated codewords, the codewords formed by a coding method, and a codeword decoder operative to decode the recognized codewords, the codeword decoder using a set of code mappings. The coding method comprises:

a first region encoder in a first region of an ordered series of quantized transform coefficients of a block of image data, the first region possibly the whole series, the series having a most likely-to-occur amplitude, and at least one other amplitude including a next-to-most likely-to-occur amplitude, the first region encoder operative to encode the position and amplitude of each cluster of consecutive coefficients having amplitude other than the most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the coding of each cluster according to at least one multi-dimensional joint encoding mapping such that for at least some events, encoding the events by the joint encoding mapping is such that on average, events that are more likely to occur are encoded by respective codewords that are shorter than the respective codewords for events that are less likely to occur; and an amplitude encoder operative to encode the amplitude of the coefficients that have amplitude other than the most likely-to-occur amplitude and that are not jointly encoded by the encoding of the indication of the number of trailing coefficients in the cluster; and Particular embodiments may provide all, some, or none of the aspects, features, or advantages described herein. Particular embodiments may provide one or more other aspects, features, or advantages, one or more of which may be readily apparent to a person skilled in the art from the figures, descriptions, and claims herein.

Example Embodiment(s)

The coding method embodiments described herein are for coding a block of image data. The block of image data is transformed, the transform coefficients are quantized, and the resulting quantized coefficients arranged as two-dimensional array are ordered, e.g., along a zig-zag path on the two-dimensional array in order of increasing spatial frequency to result in an ordered serried of quantized transform coefficients. The transform and quantizing are such that zero is the most likely-to-occur amplitude and 1 is next-most likely-to-occur amplitude. Note that those in the art will understand that the quantization and/or transforms can be changed such that other values ate the most and next-most likely-to-occur amplitudes, and that the methods described herein can then be modified to accommodate such other quantization and/or transforms. Therefore, assuming that zero is the most likely-to-occur amplitude and 1 is next-most likely-to-occur amplitude does not reduce the generality of the methods described.

Variable length coding includes recognizing events, and encoding the events using codewords such that on average, events that are more likely to occur are encoded by respective codewords that are shorter than the respective codewords for events that are less likely to occur. The lookup of codewords uses one or more code mappings that map events to the codewords. In the embodiments described herein, the mappings of events to codewords are represented by coding tables, e.g., VLC tables to look up the codeword for a particular event to encode. However, those in the art will understand that a table is only one data structure that can be used to maintain the codewords for a lookup. Therefore, by "table" is meant any data structure for storing the codewords such that a event, e.g., a value or set of values, can be looked up.

Those in the art will also understand that the VLC tables to be used are determined according to statistics of the events. In different versions, the statistics may be assumed statistics based on measurements of similar pictures or sequences of pictures, or based on assumed statistics. Furthermore, those in the art will understand that VLC tables need not include only variable length codes. In order to reduce the size of any particular table, those events that are relatively rare might be encoded by a fixed length rather than variable length code.

One embodiment of the method described herein is suitable for hybrid coding. In hybrid variable length coding, an ordered serried of quantized transform coefficients of a block of image data is partitioned into at least two regions: a low-frequency region in which clusters of non-zero coefficients are likely to exist, and a high-frequency region in which non-zero-valued coefficients are likely to be scattered, the low- and high-frequency regions being separated by a break-point. See for example, U.S. Patent Application Publication US 20050276487 to Chen et al.

FIG. 1 shows a flowchart of one embodiment of the invention. In a first region—this might be whole series—of an ordered series of quantized transform coefficients, the method includes encoding positions and amplitudes of a clusters of consecutive non-zero-valued coefficients. Each cluster is defined by one or more events including a joint position and amplitude event defined by at least the number of zero-valued coefficients preceding the cluster, and the number non-zero-valued coefficients in the cluster. In a first embodiment, called the 3-D embodiment herein, the cluster joint position and amplitude event is a 3-D event also defined by a third parameter that is indicative of the number of trailing coefficients in the cluster that have an amplitude of 1, with the coding according to a 3-dimensional joint VLC table. In another embodiment, the joint position and amplitude event is a 2-D event and the cluster is further defined by at least the number of trailing coefficients in the cluster that have an amplitude of 1. The method further includes encoding the amplitude of the other non-zero-valued coefficients in the cluster that are not encoded by the encoding of the indication of the number of trailing coefficients in the cluster that have amplitude 1, e.g., in one version by encoding the amplitudes of all but the immediately adjacent to the trailing 1's non-zero coefficient, and further encoding a value for the amplitude of the adjacent coefficient that has amplitude greater than one, e.g., as the (amplitude value minus 1), using a 1-D VLC.

In a first implementation of the 3-D embodiment, the joint event that is jointly encoded is defined by three parameters: the number, which might be 0, of consecutive zero-valued coefficients preceding the cluster, the number of on-zero-valued coefficients in the cluster, and the number of consecutive trailing coefficients in the cluster that have an amplitude of 1, such that the event uses a three-dimensional code mapping. The encoding of the amplitude of the other non-zero-valued coefficients in the cluster, e.g., in one version by encoding the amplitudes of all but the immediately adjacent to the trailing 1's non-zero coefficient uses a 1-D VLC.

In an alternate implementation of the 3-D embodiment, for one or more cluster lengths, the third parameter includes an indication of which of the coefficients in the cluster have amplitude 1.

In a second embodiment, as an alternate to the 3-D embodiment, the joint event is defined by two parameters: the number, which might be 0, of consecutive zero-valued coefficients preceding the cluster, and the number of non-zero-valued coefficients in the cluster. The encoding of the number of amplitude-1 trailing coefficients in the cluster is encoded, either separately using a 1-D VLC, or in an alternate embodiment, jointly with the amplitude of the immediately preceding coefficient that has amplitude greater than 1 using a 2-D-VLC.

Embodiments of the method further include encoding the signs of the non-zero-valued coefficients in the cluster, and concatenating the resulting codewords. In the case there is more than one region in the series, e.g., for hybrid variable length coding, the method further includes encoding the coefficients in the remaining region(s).

These features are now described in more detail.

One embodiment of the present invention includes a first coding method used to code the position of consecutive non-zero-valued coefficients that occur in runs of non-zero-valued coefficients ("clusters"), and a second coding method used to code the amplitudes of the non-zero-valued coefficients in the clusters to produce codewords for coding an ordered series of quantized coefficients of a transform of image data in a first region—the low frequency region—of the series. Such a series occurs in many image compression methods.

The inventors observed that in a run of consecutive nonzero coefficients—what we call a cluster of non-zero-valued coefficients—the probability of a coefficient having a magnitude of 1 gradually decreases as the frequency of the coefficients decreases from the highest frequency coefficient in the cluster to the lowest frequency coefficient in the cluster. In other words, the last coefficients of the cluster are more likely to have amplitude 1, while the other lower-frequency coefficients tend to have larger magnitudes. This observation led to the method described herein, which takes advantage of this observation in an encoding process.

In a first embodiment, called the 3-D embodiment herein, to code the amplitudes and positions of a cluster of one or more non-zero-valued coefficients, events that are defined by three quantities are first jointly coded by a three-dimensional mapping from the three quantities to a codeword. Each event is defined by: the number—which might be zero—of consecutive zero-valued coefficients that precede the cluster of one or more non-zero-valued coefficients, the number of non-zero valued coefficients, and a third parameter indicative of the number of trailing coefficients in the cluster that have an amplitude of 1.

FIGS. 5A, 5B, 5C, and 5D show a plurality of tables of events for clusters of 1 (FIG. 5A), 2 (FIG. 5B), 3 (FIG. 5C), . . . , n (FIG. 5D) consecutive non-zero-valued coefficients, respectively, where n is the longest cluster. In these, the third parameter indicative of the number of trailing coefficients in the cluster that have an amplitude of 1 is the number of trailing amplitude-1 coefficients. One embodiment of the invention includes, in a first region of the ordered series, which can be the whole series, or, in the case of hybrid coding, a low-frequency regions, each event is coded by a codeword according to a variable length code mapping, e.g., a variable length code table such that on average, events that are more likely to occur are given codewords that are shorter than are events that are less likely to occur. The codewords, of course, are selected to be uniquely decodable.

In addition to joint coding of coefficient positions and a parameter indicative of the number of trailing '1's, the amplitudes of the remaining nonzero coefficients in the cluster that are not encoded by the joint coding are coded separately by 1-D VLC. One embodiment includes encoding the amplitudes of all the remaining nonzero coefficients by a one dimensional code mapping, e.g., a 1-D VLC. Another embodiment encodes these non-zero coefficients as follows: the amplitudes of all the remaining nonzero coefficients except the one immediately preceding the trailing '1's are coded directly by one dimensional code mapping, e.g., a 1-D VLC while a value indicative of the amplitude of the coefficient immediately next preceding the trailing '1's, e.g., the value of that amplitude minus 1 and is coded by a 1-D VLC. The separate coding of the immediately preceding value can shorten the codeword since that coefficient must be greater than 1.

FIG. 5E shows a replacement for the table of FIG. 5A. In the replacement table according to an alternative implementation, events for clusters of length one are defined by a third parameter that indicates the actual coefficient magnitude. The quantity L in FIG. 5E denotes the actual quantized coefficient magnitude. Using the table of FIG. 5E essentially is equivalent to reducing the 3-D table of FIG. 5A to a 2-D run-level table for the isolated non-zero coefficients in the low frequency region, or throughout out the frequency spectrum if no breakpoint is used. This can improve coding efficiency; instead of using two codewords for each of those isolated non-zero-valued coefficients that are have amplitudes that are not 1, only one code word is used when using the table of FIG. 5E.

In an alternate version of the 3-D embodiment, for at least some values of the second parameter, i.e., for at least some valued of the run-length of the cluster of non-zero-valued coefficients, the third parameter indicative of the number of trailing ones further indicates which of the non-zero-valued coefficients have amplitude 1. This provides performance improvement—using a smaller number of codewords, at the expense of an increase in table size.

FIG. 5F shows a replacement of the part of the 3-D table of events shown in FIG. 5B for a cluster of length 2 non-zero-valued coefficients. A value 1 in the third parameter indicates an amplitude-1 coefficient, and a value x indicates a non-amplitude-1 coefficient. The third parameter jointly encoded with the number of preceding zero-valued coefficients and the number of non-zero-valued coefficients in the cluster includes not only an indication of the number of trailing amplitude-1 coefficients, but also an indication of where any non-amplitude-1 coefficients are in the cluster. One implementations of the alternate version of the 3-D embodiment includes jointly encoding 3-D events for a cluster of length 2 in which the third parameter jointly encoded with the number of preceding zero-valued coefficients and the number of non-zero-valued coefficients in the cluster includes not only an indication of the number of trailing amplitude-1 coefficients, but also an indication of where any non-amplitude-1 coefficients are in the cluster.

Note that the first version of the 3-D embodiment has smaller tables than the second version. However, note that, for example, to encode a cluster $1x$ using the first version using FIG. 5B encodes the event $(3,2,0)$ by a code, and encodes the amplitude x using a I-D table, then encodes the amplitude 1 using a 1-D table. To encode a cluster $1x$ using the alternate version encodes the event $(3,2,1x)$ by a code, and encodes the amplitude x using a 1-D table. One less codeword is used.

In other implementations of the alternate version of the 3-D embodiment, more cluster lengths are so encoded. FIG. 5G shows a replacement of the part of the 3-D table of events shown in FIG. 5C for a cluster of length 3 non-zero-valued coefficients. One implementations of the alternate version of the 3-D embodiment includes jointly encoding 3-D events for cluster of length 2 and clusters of length 3 in which the third parameter jointly encoded with the number of preceding zero-valued coefficients and the number of non-zero-valued coefficients in the cluster includes not only an indication of the number of trailing amplitude-1 coefficients, but also an indication of where any non-amplitude-1 coefficients are in the cluster.

In a second embodiment, the limitation of encoding together all events in which there are more pre-defined number, e.g., 3 or more trailing coefficients imposed in practice to reduce the size of the 3-D table is lifted. To code the amplitudes and positions of a cluster of one or more non-zero-valued coefficients, events that are defined by two quantities are first jointly coded by a two-dimensional mapping from the two quantities to a codeword. Each event is defined by: the number—which might be zero—of consecutive zero-valued coefficients that precede the cluster of one or more non-zero-valued coefficients, and the number of non-zero valued coefficients.

An indication of the number of trailing coefficients in the cluster that have an amplitude of 1 also is encoded. Note that here may be no trailing ones. In one version of the second embodiment, these are encoded as a run-length of the number of trailing amplitude-1 coefficients using a 1-D VLC table. In a second version, the number of trailing coefficients in the cluster that have an amplitude of 1 is jointly encoded with the amplitude of the immediately preceding coefficient that has an amplitude not equal to 1 using a 2-D VLC. In one implementation, the case of no trailing 1's is included, i.e., the number of trailing 1's is 0. Note that events for the case of the cluster having only 1's are included, i.e., that the non-1 amplitude preceding the trailing amplitude-1 coefficient is 0. Because the total number of nonzero coefficients in the cluster is coded, a decoder would know that the cluster has all 1's, so that the event of having zero non-1 coefficient is implicitly indicated by the event of having the number of trailing-1's equal to the number of nonzero coefficients. Such an event requires no bits to be included in the coded bitstream.

FIG. 6 shows a first two-dimensional code tables of events for clusters of 1, 2, 3, . . . , N consecutive non-zero-valued coefficients, respectively, where N is the longest cluster. One embodiment of the invention includes, in a first region of the ordered series, which can be the whole series, or, in the case of hybrid coding, a low-frequency regions, each event is coded by a codeword according to a variable length code mapping, e.g., a variable length code table such that on average, events that are more likely to occur are given codewords that are shorter than are events that are less likely to occur. The codewords, of course, are selected to be uniquely decodable. Denote by $C_1(z,n)$ the codeword for jointly encoding an event that includes a number $z \geqq 0$ of consecutive zero-valued coefficients followed by a cluster of $n \geqq 1$ of consecutive non-zero-valued quantized coefficients.

ficients of amplitude 1, so that only the amplitude of exceptions to amplitude-1 coefficients are marked. The method includes coding events defined by the run length, including a length of 0, or zero-valued coefficients preceding a single non-zero-valued coefficient using a one-dimensional variable length code defined, e.g., by a 1-D VLC table. The method further includes an indication of any event where the ending coefficient had amplitude greater than 1, and encoding a value indicative of that amplitude, e.g., the amplitude value minus 1. The method further includes encoding the sign of the ending non-zero-valued coefficients of the events of the second region.

Example Series

To illustrate one embodiment of the coding method by an example, assume the following series of quantized transform coefficients:

| | | | | | | | | | Freq. Index: | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | ... | ... |
| Coefficients: | 0 | 9 | 8 | 5 | 1 | 0 | 0 | 3 | −1 | 1 | 0 | 0 | 0 | 0 | 0 | −1 | 0 | 0 | ... | 0 |

FIG. 7 shows one version of encoding the trailing amplitude-1 coefficients in each cluster, in this version jointly with the amplitude of the immediately preceding non-amplitude-1 coefficient. In FIG. 7, denote by $C_2(t,A_t)$ the variable length codeword for a run-length of t trailing amplitude-1 coefficients immediately preceded by a coefficient of amplitude of $A_t$, with $n>t\geqq 0$, $A_t>1$ and $A_t=0$ if and only if t=n. n denoted the number of non-zero-valued coefficients in the cluster. For a cluster of such length n, a table up n only is used. Note that in one embodiment, a single Table 7 is stored, while in another embodiment, different tables are stored for each cluster length n.

In the implementation illustrated by the code tables of FIGS. 6 and 7, in addition to joint coding of coefficient positions and cluster size, and joint coding of the number trailing '1' with the immediately preceding non-amplitude-1 coefficient, the amplitudes of the remaining nonzero coefficients in the cluster are coded separately by 1-D VLC. One embodiment includes encoding the amplitudes of all the remaining nonzero coefficients except the one immediately preceding the trailing '1's by a one dimensional code mapping, e.g., a 1-D VLC.

Figure 8:
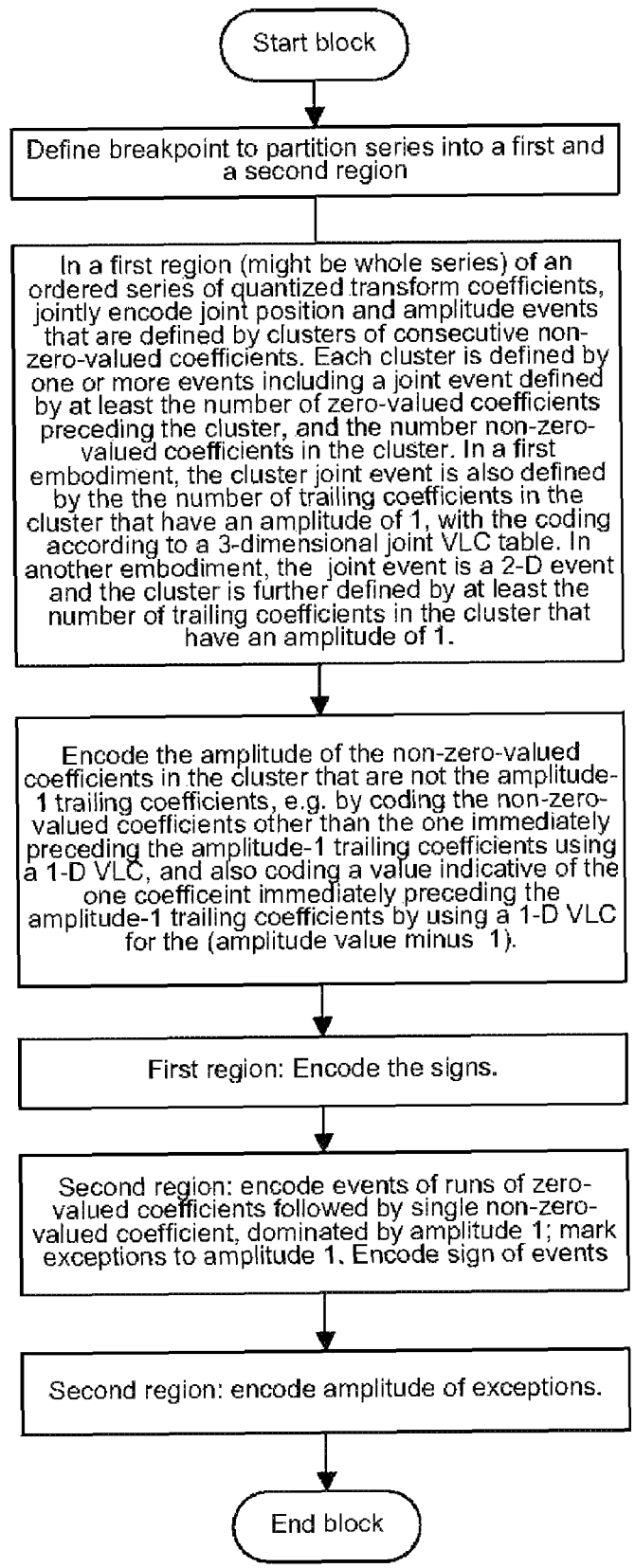
FIG. 8 shows a flowchart of one embodiment of a hybrid coding that includes an embodiment of the present coding method for the first, e.g., low frequency region where clusters of non-zero-valued coefficients may be likely to occur.

Hybrid variable length coding is known in which an ordered serried of quantized transform coefficients of a block of image data is partitioned into a low-frequency region in which clusters of non-zero coefficients are likely to exist, and to a high-frequency region in which non-zero-valued coefficients are likely to be scattered, the low- and high-frequency regions being separated by a breakpoint. See for example, U.S. Patent Application Publication US 20050276487 to Chen et al. FIG. 8 shows a flowchart of one embodiment of a hybrid coding method that includes the method shown in FIG. 1 for the first region. The method includes determining or using a pre-defined breakpoint that partitions the series into a first, e.g., low frequency region, and a second, e.g., high frequency region. In the first region, the method includes steps described above and in FIG. 1 for the first region. In the second region, the method uses a second (high-frequency) coding method described in US 20060039615 in which the second region is assumed to be dominated by scattered coef- Applying hybrid variable length coding (HVLC) with a breakpoint of 10, and using the joint coding method described herein using the first version of the 3-D embodiment (using the events as shown in FIGS. 5A-5D) that includes three parameter joint event coding for the low-frequency coefficients and conventional 2-D run length coding for the high-frequency coefficients, the above coefficient series would be coded as follows.

$C_m(1,4,1)+S_++C_A(9)+S_++C_A(8)+S_++C_A(4)+S_++C_m(1,3,2)+S_++S_-+C_A(2)+S_++C_{RL}(4,1)+S_-$ where "+" denoted concatenation $C_m(,,)$ denotes the variable length codewords of three-dimensional amplitude and position coding in which the first parameter is the number of preceding zero-valued coefficients, the second parameter is the cluster length, and the third parameter is the number of trailing amplitude-1 coefficients, $C_A( )$ denotes the variable length codeword using a 1-D amplitude code mapping, $C_{RL}(.)$ denotes the variable length codeword using conventional (run, level)-run length coding, respectively, and $S_+$ and $S_-$ respectively indicate the codeword for positive and negative nonzero amplitude coefficients.

Note because each cluster as defined in one embodiment also ends with a zero-valued coefficient, so that the first cluster is 9 8 5 1 0, with one preceding zero-valued coefficient, the second cluster is 3 −1 1 0 with only one preceding zero-valued coefficient, etc.

To illustrate the second embodiment of the coding method by an example, assume the same series of quantized transform coefficients. Applying hybrid variable length coding (HVLC) with a breakpoint of 10, and using the two joint coding method described herein with two 2-D joint events as shown in FIGS. 6 and 7 for the low-frequency coefficients and conventional 2-D run length coding for the high-frequency coefficients, the above coefficient series would be coded as follows.

$C_1(1,4)+C_2(1,5)+S_++S_++C_A(9)+S_++C_A(8)+S_++C_1(1,3)+C_2(2,3)+S_++S+S_++C_{RL}(4,1)+S$ where "+" denoted concatenation $C_1(z,n)$ the codeword for jointly encoding an event that includes a number $z \geqq 0$ of consecutive zero-valued coefficients followed by a cluster of $z \geq 1$ of consecutive non-zero-valued quantized coefficients, $C_2(t, A_t)$ the variable length codeword for a run-length of t trailing amplitude-1 coefficients immediately preceded by a coefficient of amplitude of $A_t$, with $t \geq 0$, $A_t \neq 1$ and $A_t = 0$ only if $A_t \neq 0$, $C_A()$ denotes the variable length codeword using a 1-D amplitude code mapping, $C_{RL}(,)$ denotes the variable length codeword using conventional (run, level)-run length coding, respectively, and $S_+$ and $S_-$ respectively indicate the codeword for positive and negative nonzero amplitude coefficients.

Again note that because each cluster as defined in one embodiment also ends with a zero-valued coefficient, so that the first cluster is 9 8 5 1 0, with one preceding zero-valued coefficient, the second cluster is 3 −1 1 0 with only one preceding zero-valued coefficient, etc.

U.S. Provisional Patent Application No. 60/976,847 to Junlin Li et al., titled "REDUCED CODE TABLE SIZE IN JOINT AMPLITUDE AND POSITION CODING OF COEFFICIENTS FOR VIDEO COMPRESSION", which in one hybrid coding embodiment, includes, in the first region, jointly encoding joint position and amplitude events that each are defined by a cluster of consecutive non-zero-valued coefficients, each joint event defined by three parameters: the number of zero-valued coefficients preceding the cluster, the number of non-zero-valued coefficients in the cluster, and an indication of which trailing coefficients up to a maximum number M of trailing coefficients have amplitude greater than 1, with the coding according to a 3-dimensional joint VLC table. The method further includes encoding the amplitude of the non-zero-valued trailing coefficients that have amplitude greater than 1 using a 1-D VLC for each value indicative of the amplitude, e.g., the (amplitude value minus 1). The method further includes encoding the amplitude of any remaining non-zero-valued coefficients in the clusters that have more than M non-zero-valued coefficients. The method further includes encoding the signs of the non-zero-valued coefficients in the cluster, and concatenating the resulting codewords. In the case there is more than one region in the series, e.g., for hybrid variable length coding, the method further includes encoding the coefficients in the remaining region(s).

Experimental results show that compared with an embodiment of the method proposed in U.S. Provisional Patent Application No. 60/976,847, with M=3, an embodiment of the herein-presented coding method provides similar bit-rate performance with similar code table size. In other words, the two methods achieve similar tradeoff between code table size and coding efficiency. However, compared to the method in which the number of that includes no more than M trailing coefficients of any non-zero amplitude, embodiments of the present invention using a 3-D VLC were found to be easier to control and more suitable for a context-based adaptive coding strategies that include VLC table switching according to context.

Decoding

While the above descriptions were mostly of coding methods, those in the art will understand that the present description also leads to decoding methods and apparatuses that decode a bitstream that was coded by any of the coding embodiments described herein. The decoding method includes accepting a bitstream including codewords encoded by the coding method described above, including recognizing codewords in the bitstream and decoding the codewords.

Apparatuses

Particular embodiments include an apparatus comprising: an encoder operative to encode the position and amplitudes of clusters of non-zero-valued coefficients in an ordered series of quantized transform coefficients of a block of image data, the series having a most likely-to-occur amplitude, e.g., 0, and at least one other amplitude including a next-to-most likely-to-occur amplitude, e.g., 1, the encoder including a joint encoder operative to encode in a first region of the series, joint position and amplitude events that each are defined by a cluster of consecutive non-zero-valued coefficients, each event defined by three parameters: the number of zero-valued coefficients preceding the cluster, the number of non-zero-valued coefficients in the cluster, and a third parameter indicative of the number of trailing non-zero-valued coefficients that have amplitude 1 in the cluster, with the coding according to a 3-dimensional joint VLC table.

The apparatus further includes an amplitude encoder operative to encode the non-zero valued coefficients that were not encoded by the joint encoding, e.g., encoding other than the amplitude-1 trailing coefficients. In one embodiment, the coefficient amplitude encoder uses a 1-D VLC for each value indicative of the amplitude. One embodiment separately encodes the non-zero-valued coefficients other than that adjacent to the training amplitude-1 coefficients, then encodes a value, the (amplitude value minus 1) of the adjacent non-zero coefficient since that coefficient has amplitude greater than 1.

The apparatus further includes a sign encoder operative to encode the sign of the non-zero-valued coefficients in the clusters.

One embodiment of the encoder that encodes using a hybrid variable length coding method is operative to encode, in the case there are two or more regions defines for the ordered series, the coefficients of the remaining regions.

The encoder further includes a concatenator operative to concatenate the resulting codewords.

Figure 2:
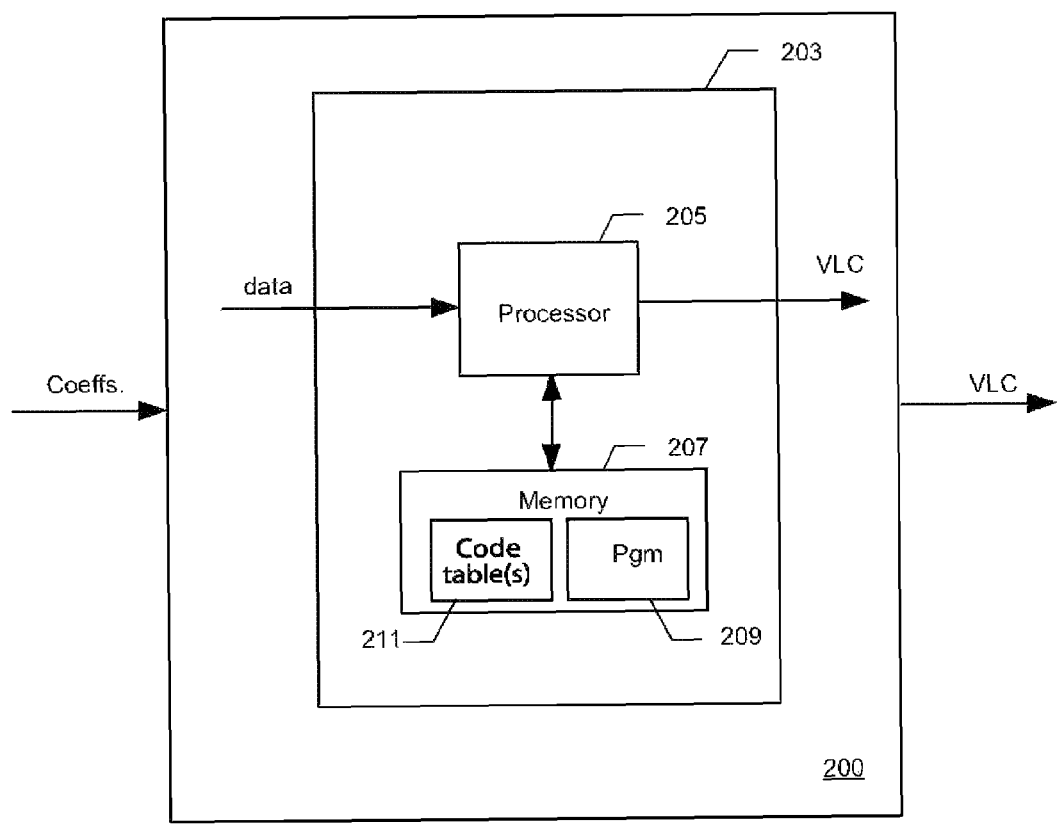
FIG. 2 shows embodiment that includes an apparatus that is configured to implement a coding method as described herein.

FIG. 2 shows embodiment that includes an apparatus 200 that is operable to implement a coding method as described herein, e.g., as described in FIG. 1. Apparatus 200 includes processing system 203 that includes one or more processors 205 and a memory 207. A single processor is shown in FIG. 2 and those in the art will appreciate that this may represent several processors. Similarly, a single memory subsystem 207 is shown, and those in the art will appreciate that the memory subsystem may include different elements such as RAM, ROM, and so forth. In addition, the memory subsystem is meant to include any non-volatile memory storage such as a magnetic or optical storage component. A computer program 209 is included and is loaded into the memory 207. Note that at any time, some of the programs may be in the different parts of the memory subsystem, as will be understood by those in the art. The program 209 includes instructions to instruct the processor to implement, in different versions, the different coding methods including the different position coding methods. In the embodiment shown, the method uses one or more coding tables 211 in the memory subsystem 207.

Figure 3:
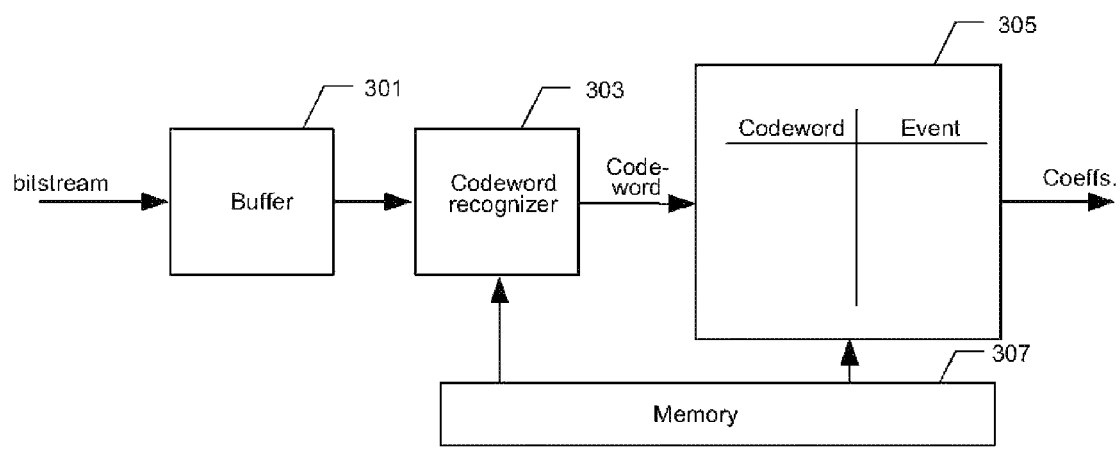
FIG. 3 shows one embodiment of a decoder.

FIG. 3 shows one embodiment of a decoder. The apparatus includes an input buffer 301 that is operable to accept a bitstream encoded by a compression method that includes any of the coding method embodiments described herein.

The output of the buffer acts as input to a codeword recognizer 303 that accepts the bits of the input bitstream and that is operable to determine which of the coding tables the codeword is from. A decoder 305 is coupled to the codeword recognizer 303 and is operable to determine the data for the codeword recognized by the codeword recognizer, including, for any of the position coding methods described herein, a codeword recognizer that can ascertain the position of the nonzero or zero valued coefficients, depending on the position coding used. The codeword recognizer also recognizes other codewords that encode other parameters encoded by the coding method, including the nonzero values, an indication of the number of trailing coefficients, and so forth. In one embodiment, the decoder 305 includes a lookup device that looks up the appropriate decoding table stored in a memory 307. That table provides the event for at least some of the codewords of the set of codewords. Other codewords may include an "escape" code, so that decoding is by other than a table lookup method.

While in the embodiment shown in FIG. 3, the memory is shown separate from the lookup device (decoder) 305, those in the art will understand that in other embodiments, the lookup device 305 includes memory for the tables, and such other embodiments are included herein.

Figure 4:
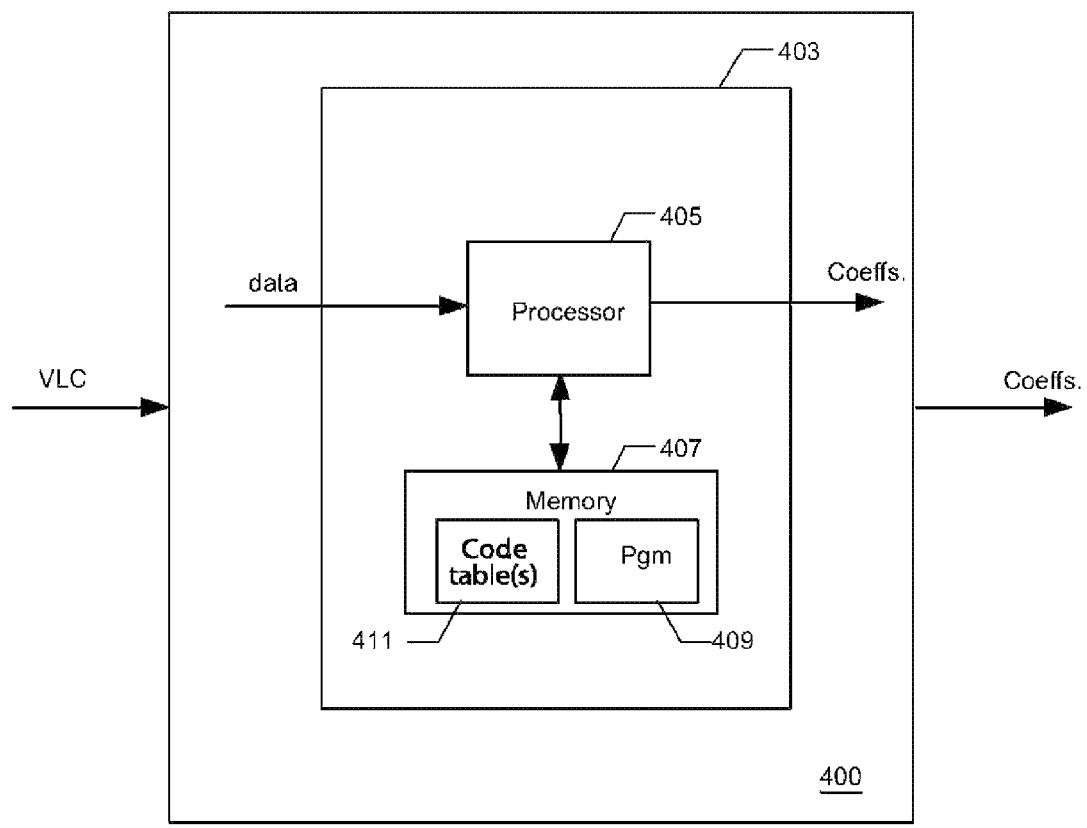
FIG. 4 shows another embodiment that includes an apparatus operable to implement a decoder of a variable length coding method described herein.

FIG. 4 shows another embodiment that includes an apparatus 400 operable to implement a decoder of a variable length coding method described herein. Decoding apparatus 400 includes a processing system 403 that includes one or more processors 405 and a memory 407. A single processor is shown in FIG. 4 and those in the art will appreciate that this may represent several processors. Similarly, a single memory subsystem 407 is shown, and those in the art will appreciate that the memory subsystem may include different elements such as RAM, ROM, and so forth. In addition, the memory subsystem is meant to include any non-volatile memory storage such as a magnetic or optical storage component. A computer program 409 is included and is loaded into the memory 407. Note that at any time, some of the programs may be in the different parts of the memory subsystem, as will be understood by those in the art. The program 409 includes instructions to instruct the processor to implement, in different versions, the recognizing and decoding of codewords. In the embodiment shown, the decoding method uses one or more coding tables 411 in the memory subsystem 407.

Other embodiments include logic encoded in one or more tangible media for execution and when executed operable to carry out any of the coding methods described herein. How to implement such logic would be clear to one in the art from the description herein.

Other embodiments include logic encoded in one or more tangible media for execution and when executed operable to carry out any of the decoding methods described herein. How to implement such logic would be clear to one in the art from the description herein.

Other embodiments include software encoded in one or more computer-readable media and when executed operable to carry out any of the coding methods described herein. How to implement such software would be clear to one in the art from the description herein.

Other embodiments include software encoded in one or more computer-readable media and when executed operable to carry out any of the decoding methods described herein. How to implement such software would be clear to one in the art from the description herein.

Other embodiments include a computer-readable medium having a set of instructions encoded thereon that when executed by one or more processors of a processing system cause carrying out any of the coding methods described herein.

Other embodiments include a computer-readable medium having a set of instructions coded thereon that when executed by one or more processors of a processing system cause carrying out any of the decoding methods described herein.

The term "series" as used herein for the series of quantized coefficients is sometimes referred to as a "block" of coefficients, and also as a "series" of coefficients. Sometimes the term sequence of coefficients is used. Those in the art will understand that such terms may be interchangeably used and the meaning would be clear to those in the art from the context.

Also, in the description, it is assumed that the series includes only the AC coefficients and that the DC coefficient of the transform of the block is separately encoded. How to modify the methods described herein to include the DC coefficient would be clear to those in the art.

Furthermore, in the description of example embodiments it was assumed that the quantization of coefficients is such that zero is the most likely to occur amplitude, and 1 is the next most likely to occur amplitude. Of course it is possible to quantize in a manner so that other values or events are used for the most likely-to-occur quantized value or values, and different other values or events are used for the next most likely-to-occur quantized value or values. Those in the art will understand how to modify the particulars described herein to accommodate such variations, and such variations are certainly meant to be within the scope of the present invention.

Furthermore, the invention is not limited to any one type of architecture or type of transform encoding. The transform used in one embodiment is the 8×8 transform defined in the H.264/MEG-4 AVC video coding standard/draft standard for the High Profile. Other embodiments use the transform for the Chinese AVS standard. Other embodiments use a discrete cosine transform (DCT). Other transforms also are possible. Also the bock size described herein is 8 by 8, and other block sizes also may be used in alternate embodiments.

The invention does not depend on any particular type of inter-frame coding if used, or of motion compensation if used for inter-frame coding, or any intra-estimation if used for estimating the pixels of a block using information from neighbouring blocks.

Note that variable length coding is sometimes referred to as entropy coding or statistical coding.

Note that the terms coding and encoding are used interchangeably herein.

In some of the embodiments described above, no sign data was included. Most transforms produce positive and negative coefficients, and the forming of the codeword includes an indication of the sign of any nonzero-valued coefficients. In one version, the sign information for any runs of nonzero amplitudes in any region is added together with the information of each amplitude. In an alternate embodiment, the sign information for any runs of nonzero amplitudes in any region may be included in a different manner, e.g., as a code for the series of signs. Other alternate embodiments are also possible for encoding the sign.

Note that in some examples for amplitude encoding, a different number of possible nonzero values can be assumed for the coefficients. The invention however is not restricted to any number of possible quantization values.

Note also that the term amplitude is irrespective of sign. Therefore, for example, coefficient of values +1 and −1 both have amplitude 1.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of variable length coding used for any of the coding methods, e.g., the coding tables, and can work, for example, with Huffman coding and with arithmetic coding methods. Furthermore, while embodiments have been described that use fixed encoding for the events based on assumed or a priori likelihoods of occurrence of the events (also called the events), i.e., the likelihoods of occurrence of the events do not change, other embodiments use adaptive encoding, i.e., the encoding is changeable according to statistical data such as histograms collected from the actual coefficients.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps, is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that is encoded with logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable medium on which is encoded logic, e.g., in the form of instructions.

Furthermore, a computer-readable medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium having a set of instructions, e.g., a computer program encoded thereon that are for execution on one or more processors, e.g., one or more processors that are part of coder, or a decoder. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable medium encodes logic including a set of instructions that when executed on one or more processors cause implementing a method. Accordingly, aspects of the present invention may take the form of a method, an entirely hardware embodiment, an entirely software embodiment or an embodiment combining software and hardware aspects. Furthermore, the present invention may take the form of a medium (e.g., a computer program product on a computer-readable storage medium) having program code encoded on the medium.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Description of Example Embodiments are hereby expressly incorporated into this Description of Example Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given series, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating an encoding apparatus to compress image data, the method comprising:

accepting quantized transform coefficients of one or more blocks of image data into the encoding apparatus;

for a first region of an ordered series of quantized transform coefficients of a block of image data, the first region possibly including the whole series, the series having a most likely-to-occur amplitude, and at least one other amplitude including a next-to-most likely-to-occur amplitude, the encoding apparatus encoding the position and amplitude of each cluster of consecutive coefficients having amplitude other than the most likely-to-occur amplitude, the encoding of each cluster including the encoding apparatus encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, the encoding of the events by the encoding apparatus forming event codewords, with the encoding of each cluster according to at least one multi-dimensional joint encoding mapping such that for at least some events, encoding the events by the joint encoding mapping is such that on average, the more likely an event is to occur, the shorter the event codeword formed to encode the event; and the encoding apparatus encoding the amplitude of the coefficients that have amplitude other than the most likely-to-occur amplitude and that are not jointly encoded by the encoding of the indication of the number of trailing coefficients in the cluster, the encoding of the amplitude by the encoding apparatus forming amplitude codewords.

2. A method as recited in claim 1, wherein the encoding of each cluster includes jointly encoding an event defined by three parameters: the number of coefficients having the most likely-to-occur amplitude preceding the cluster, the number of coefficients in the cluster, and a third parameter that includes an indication of the number of trailing coefficients having the next-to-most likely-to-occur amplitude in the cluster, with the jointly encoding being according a three-dimensional joint encoding mapping such that for at least some events, encoding the events by the joint encoding mapping is such that on average, the more likely an event is to occur, the shorter the codeword used to encode the event.

3. A method as recited in claim 2, wherein the third parameter is the number of trailing coefficients in the cluster that have the next-to-most likely-to-occur amplitude.

4. A method as recited in claim 2, wherein, for at least one cluster length, the third parameter includes an indication of which of the coefficients in the cluster have the next-to-most likely-to-occur amplitude.

5. A method as recited in claim 1, wherein the encoding of each cluster includes jointly encoding an event defined by two parameters: the number of coefficients having the most likely-to-occur amplitude preceding the cluster, and the number of coefficients in the cluster, and further encoding a second event for the cluster defined by the number of trailing coefficients having the next-to-most likely-to-occur amplitude in the cluster, with the jointly encoding being according a first two-dimensional joint encoding mapping such that for at least some events, encoding the events by the joint encoding mapping is such that on average, the more likely an event is to occur, the shorter the codeword used to encode the event.

6. A method as recited in claim 5, wherein the second event for each cluster is a one dimensional event defined by the number of trailing coefficients having the next-to-most likely-to-occur amplitude in the cluster, with the encoding of the second event being according to a one-dimensional encoding mapping such that for at least some events, encoding the second events by the one-dimensional encoding mapping is such that on average, the more likely an event is to occur, the shorter the codeword used to encode the event.

7. A method as recited in claim 5, wherein the second event for each cluster is defined by two parameters: the number of consecutive trailing coefficients having the next-to-most likely-to-occur amplitude in the cluster, the amplitude of the coefficient immediately preceding the consecutive trailing coefficients having the next-to-most likely-to-occur amplitude in the cluster with the encoding of the second event for the cluster being according a second two-dimensional joint encoding mapping such that for at least some events, encoding the events by the joint encoding mapping is such that on average, the more likely an event is to occur, the shorter the codeword used to encode the event.

8. A method as recited in claim 1, wherein encoding the amplitude of the coefficients that have amplitude other than the most likely-to-occur amplitude includes encoding the coefficients other than the coefficient adjacent to the trailing coefficients of the cluster, and further encoding a value equal to one less than the amplitude of the coefficient immediately preceding the trailing coefficients in that cluster that have the next-to-most likely-to-occur amplitude value.

9. A method as recited in claim 1, wherein 0 is the most-likely-to-occur amplitude and 1 is the next-to-most likely-to-occur amplitude.

10. A method as recited in claim 9, further comprising:
encoding the signs of the non-zero-valued coefficients in the cluster.

11. A method as recited in claim 9, wherein the first region is one of a plurality of regions, the first region being one wherein clusters of non-zero-valued coefficients are likely to occur, the method further comprising:
encoding the coefficients in the remaining region(s).

12. A computer-readable hardware storage medium encoded with computer-executable instructions that when executed by one or more processors of a processing system implement a coding method comprising:
for a first region of an ordered series of quantized transform coefficients of a block of image data, the first region possibly the whole series, the series having a most likely-to-occur amplitude, and at least one other amplitude including a next-to-most likely-to-occur amplitude, encoding the position and amplitude of each cluster of consecutive coefficients having amplitude other than the most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the coding of each cluster according to at least one multi-dimensional joint encoding mapping such that for at least some events, encoding the events by the joint encoding mapping is such that on average, the more likely an event is to occur, the shorter the codeword used to encode the event; and
encoding the amplitude of the coefficients that have amplitude other than the most likely-to-occur amplitude and that are not jointly encoded by the encoding of the indication of the number of trailing coefficients in the cluster.

13. A computer-readable hardware storage medium as recited in claim 12, wherein in the method, the encoding of each cluster includes jointly encoding an event defined by three parameters: the number of coefficients having the most likely-to-occur amplitude preceding the cluster, the number of coefficients in the cluster, and a third parameter that include an indication of the number of trailing coefficients having the next-to-most likely-to-occur amplitude in the cluster, with the jointly encoding being according a three-dimensional joint encoding mapping such that for at least some events, encoding the events by the joint encoding mapping is such that on average, the more likely an event is to occur, the shorter the codeword used to encode the event.

14. A computer-readable hardware storage medium as recited in claim 12, wherein in the method, the coding of each cluster includes jointly encoding an event defined by two parameters: the number of coefficients having the most likely-to-occur amplitude preceding the cluster, and the number of coefficients in the cluster, and further encoding a second event for the cluster defined by the number of trailing coefficients having the next-to-most likely-to-occur amplitude in the cluster, with the jointly encoding being according a first two-dimensional joint encoding mapping such that for at least some events, encoding the events by the joint encoding mapping is such that on average, the more likely an event is to occur, the shorter the codeword used to encode the event.

15. A computer-readable hardware storage medium as recited in claim 14, wherein in the method, the second event for each cluster is a one dimensional event defined by the number of trailing coefficients having the next-to-most likely-to-occur amplitude in the cluster, with the encoding of the second event being according to a one-dimensional encoding mapping such that for at least some events, encoding the second events by the one-dimensional encoding mapping is such that on average, the more likely an event is to occur, the shorter the codeword used to encode the event.

16. A computer-readable hardware storage medium as recited in claim 14, wherein in the method, the second event for each cluster is defined by two parameters: the number of consecutive trailing coefficients having the next-to-most likely-to-occur amplitude in the cluster, the amplitude of the coefficient immediately preceding the consecutive trailing coefficients having the next-to-most likely-to-occur amplitude in the cluster with the encoding of the second event for the cluster being according a second two-dimensional joint encoding mapping such that for at least some events, encoding the events by the joint encoding mapping is such that on average, the more likely an event is to occur, the shorter the codeword used to encode the event.

17. A computer-readable hardware storage medium as recited in claim 12, wherein 0 is the most likely-to-occur amplitude and 1 is next-to-most likely-to-occur amplitude.

18. A computer-readable hardware storage medium as recited in claim 17, wherein the method further includes:
   encoding the signs of the non-zero-valued coefficients in the cluster.

19. A computer-readable hardware storage medium in claim 17, wherein the first region is one of a plurality of regions, the first region being one wherein clusters of non-zero-valued coefficients are likely to occur, and wherein the method further comprises:
   encoding the coefficients in the remaining region(s).

20. An apparatus to accept image data and transform the image data to event codewords and amplitude codewords, the apparatus comprising:
   a first region encoder operative to accept an ordered series of quantized transform coefficients of a block of the image data and to form one or more event codewords by encoding the position and amplitude of each cluster of consecutive coefficients having amplitude other than the most likely-to-occur amplitude in a first region of an ordered series of quantized transform coefficients of a block of the image data, the first region possibly the whole series, the series having a most likely-to-occur amplitude, and at least one other amplitude including a next-to-most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the encoding of each cluster according to at least one multi-dimensional joint encoding mapping such that for at least some events, encoding the events by the joint encoding mapping is such that on average, the more likely an event is to occur, the shorter the event codeword used to encode the event; and
   an amplitude encoder coupled to the first region encoder and operative to encode the amplitude of the coefficients that have amplitude other than the most likely-to-occur amplitude and that are not jointly encoded by the encoding of the indication of the number of trailing coefficients in the cluster.

21. An apparatus as recited in claim 20, wherein the first region encoder is operative such that the encoding of each cluster includes jointly encoding an event defined by three parameters: the number of coefficients having the most likely-to-occur amplitude preceding the cluster, the number of coefficients in the cluster, and a third parameter indicative of the number of trailing coefficients having the next-to-most likely-to-occur amplitude in the cluster, with the jointly encoding being according a three-dimensional joint encoding mapping such that for at least some events, encoding the events by the joint encoding mapping is such that on average, the more likely an event is to occur, the shorter the codeword used to encode the event.

22. An apparatus as recited in claim 20, wherein the first region encoder is operative such that the encoding of each cluster includes jointly encoding an event defined by two parameters: the number of coefficients having the most likely-to-occur amplitude preceding the cluster, and the number of coefficients in the cluster, and further encoding a second event for the cluster defined by the number of trailing coefficients having the next-to-most likely-to-occur amplitude in the cluster, with the jointly encoding being according a first two-dimensional joint encoding mapping such that for at least some events, encoding the events by the joint encoding mapping is such that on average, the more likely an event is to occur, the shorter the codeword used to encode the event.

23. An apparatus as recited in claim 20, wherein 0 is the most-likely-to-occur amplitude and 1 is the next most-likely to occur amplitude.

24. A method of operating a decoding apparatus to decompress image data, the method comprising:
   the decoding apparatus recognizing codewords in a set of concatenated codewords, the codewords formed by a coding method comprising:
      for a first region of an ordered series of quantized transform coefficients of a block of image data, the first region possibly the whole series, the series having a most likely-to-occur amplitude, and at least one other amplitude including a next-to-most likely-to-occur amplitude, encoding the position and amplitude of each cluster of consecutive coefficients having amplitude other than the most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the coding of each cluster according to at least one multi-dimensional joint encoding mapping such that for at least some events, encoding the events by the joint encoding mapping is such that on average, the more likely an event is to occur, the shorter the codeword used to encode the event; and
      encoding the amplitude of the coefficients that have amplitude other than the most likely-to-occur amplitude and that are not jointly encoded by the encoding of the indication of the number of trailing coefficients in the cluster; and
   the decoding apparatus decoding the recognized codewords using a plurality of code mappings.

25. A computer-readable hardware storage medium storing computer-executable instructions that when executed by one or more processors of a processing system implement a decoding method comprising:
   recognizing codewords in a set of concatenated codewords, the codewords formed by a coding method comprising:
      for a first region of an ordered series of quantized transform coefficients of a block of image data, the first region possibly the whole series, the series having a most likely-to-occur amplitude, and at least one other amplitude including a next-to-most likely-to-occur amplitude, encoding the position and amplitude of each cluster of consecutive coefficients having amplitude other than the most likely-to-occur amplitude, the encoding of each cluster including encoding one or more events for the cluster, including encoding a joint event defined by at least two parameters: the number of coefficients having the most likely-to-occur amplitude preceding the cluster, and the number of coefficients in the cluster, and encoding an indication of the number of trailing coefficients having the next-to-most likely-to-occur amplitude in the cluster, with the coding of each cluster according to at least one multi-dimensional joint encoding mapping such that for at least some events, encoding the events by the joint encoding mapping is such that on average, the more likely an event is to occur, the shorter the codeword used to encode the event; and encoding the amplitude of the coefficients that have amplitude other than the most likely-to-occur amplitude and that are not jointly encoded by the encoding of the indication of the number of trailing coefficients in the cluster; and decoding the recognized codewords using a plurality of code mappings.

\* \* \* \* \*